UNITED STATES PATENT OFFICE.

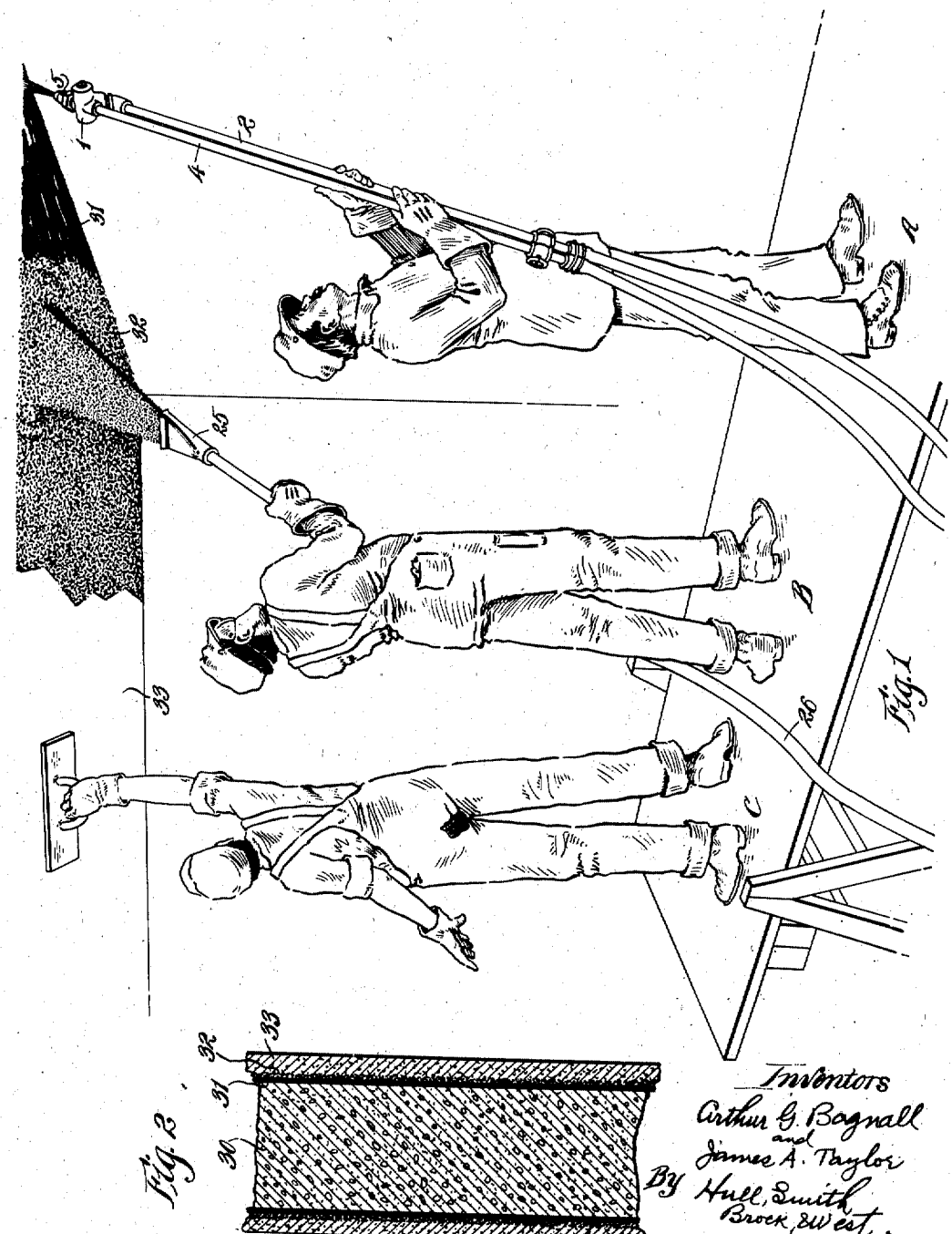

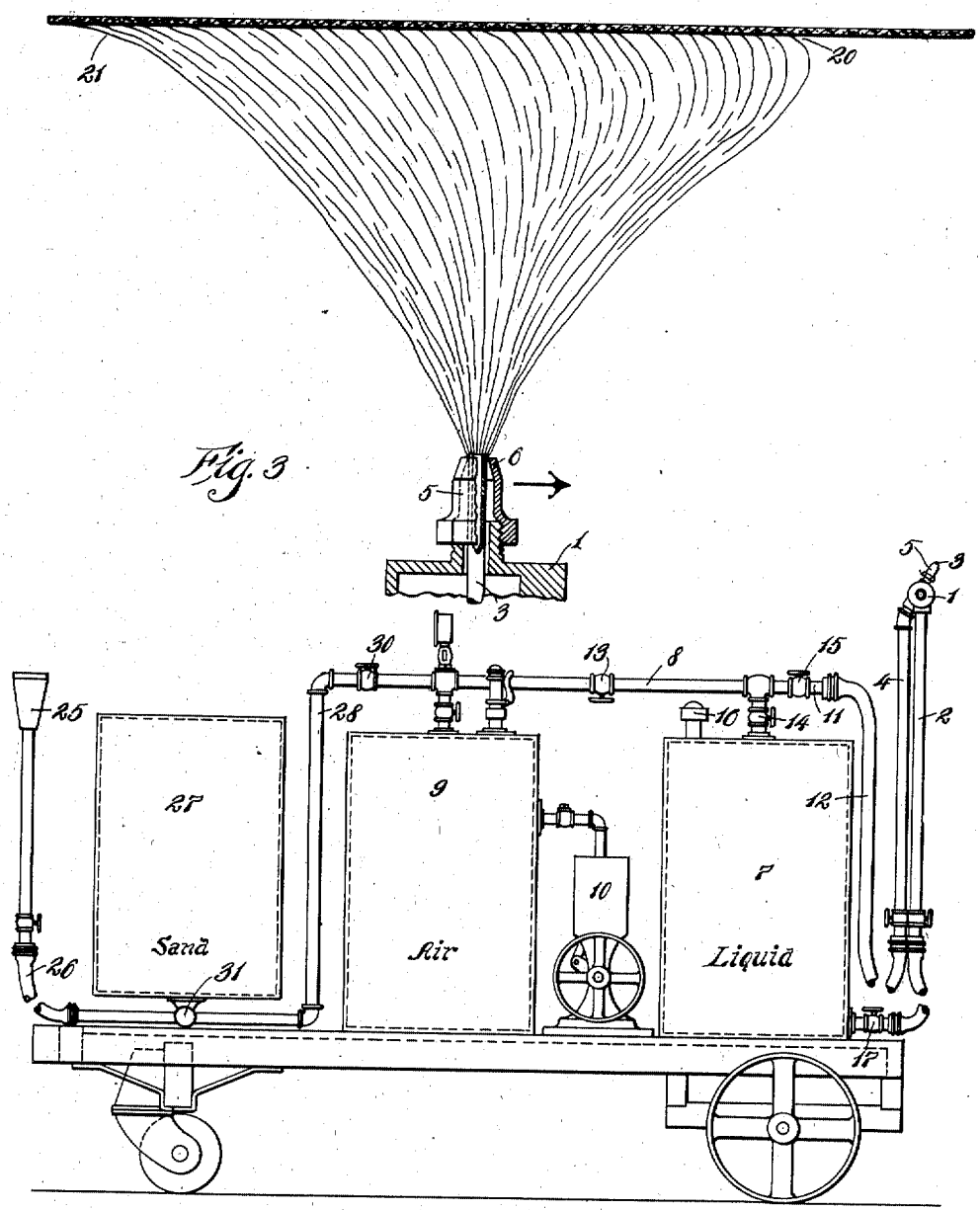

ARTHUR G. BAGNALL AND JAMES A. TAYLOR, OF CLEVELAND, OHIO, ASSIGNORS TO CHARLES H. PARKIN, OF CLEVELAND, OHIO.

PROCESS OF COATING SURFACES.

1,239,074.      Specification of Letters Patent.      Patented Sept. 4, 1917.

Application filed June 16, 1916. Serial No. 103,949.

*To all whom it may concern:*

Be it known that we, ARTHUR G. BAGNALL, (1,) JAMES A. TAYLOR, (2,) residing at (1) Cleveland, (2) Cleveland, in the county of Cuyahoga and State of Ohio, have invented a certain new and useful Improvement in Processes of Coating Surfaces, of which the following is a full, clear, and exact description, reference being had to the accompanying drawings.

This invention relates to the art of coating surfaces and with special reference to the art of applying a plaster, stucco, or other finishing surface to a cement or cement concrete base, although it is susceptible of use upon any kind of a base or for securing any kind of a surface thereto, or even to be employed partially in case a partial application shall be sufficient for the purpose in view.

It has long been noted that if a plaster coat, by which we mean a finishing layer containing calcined gypsum, be applied directly to a Portland cement structure its adhesion is very weak and the plaster frequently falls off after a short time. Sometimes there appears to be an injurious chemical reaction, and sometimes no particular chemical action appears to occur. We do not herein pretend to distinguish the reasons for the actions mentioned, but merely to set them down as a fact. It is also characteristic of concrete and cementitious structures that they are exceedingly porous and pervious to moisture, which renders it difficult or impossible and always unhealthful to apply a finishing coat directly thereto, and even when no finishing coat is applied the walls are frequently damp and always streaked and discolored.

Many expedients have been suggested for overcoming these disadvantages, certain of the same being mentioned in the United States patent of Worthen *et al.* #95,300 dated September 28, 1869, and that of J. Schirra #825,870 dated July 10, 1906, according to which the surface to be treated, after having been first cleaned and dried is covered with a molten pitchy substance applied by a brush or mop. Then before this hardens, gravel or sand is applied by hand and pressed into the surface of this coating so as to adhere thereto. Finally after the coating has hardened a plaster coat or any other desired finishing layer can be applied to the exposed face of the gravel. These processes have been very awkward and expensive and have never received any great amount of support as applied to building operations. The necessity of cleaning the walls thoroughly, the necessity of securing a certain condition of dryness, the necessity of applying the material in a heated condition, and of affixing the gravel grains before it cools have impeded the practical adoption of such a process. Also it has hitherto been the practice in applying the sand or gravel to mix the same with a small amount of plaster and water so as to enable the same to be handled with trowels and thus forced by muscular strength into the pitch layer.

According to our invention we apply to the wall or structure by air pressure a coating of adhesive gummy material which is viscous and tenacious both hot and cold and which retains those qualities for a considerable time; we apply this air pressure in such wise as to beat or force or inject the said viscous material against and into the surface of the concrete or other mass; we next force into the said layer a sufficiency of clean, sharp sand or gravel of appropriate size by means of an air blast; and we finally apply the plaster or other coating of any desired character in the usual or any approved manner.

For the viscous material we preferably employ a mixture of asphaltum and petroleum products, with or without other retaining or liquefying materials, so proportioned as to be viscous and tenacious when cold and having such ductility as to enable its being drawn out to a very fine tenacious film. Such a material having exactly the properties described is now in open sale upon the market under the name "Lifekote damp proof bond," sold by the Union Products Company, Incorporated, of Cleveland, Ohio, but other mixtures and ingredients can be devised to possess these qualities.

For applying the same we preferably employ a peculiar kind of nozzle of the type illustrated and described in this application and specifically claimed in our copending application filed of even date herewith, Serial No. 103,950.

In the drawings accompanying and forming part of this application we have shown certain manipulations, tools, and structures connected with our said invention. In these drawings Figure 1 illustrates the three essential steps comprising our complete process;

Fig. 2 represents a cross sectional view through a wall finished in accordance with our invention: Fig. 3 represents the mode of operation of our improved nozzle; and Fig. 4 represents a convenient mechanism for use in performing the steps herein described.

Assuming that it is desired to affix a plaster surface to a concrete base, as soon as the concrete has set sufficiently, but without the necessity of having it dry or roughened or particularly clean, a workman indicated at A projects thereon a suitable quantity of the plastic viscous material heretofore described. For this operation there is preferably employed a nozzle of the type shown in Figs. 3 and 4, and comprising a barrel 1 having attached thereto a hose pipe 2 and traversed by a jet pipe 3 which forms a continuation of the hollow handle 4. Surrounding the jet pipe 3 is a hollow nipple 5 whose end defines an annular passageway 6 communicating with the interior of the barrel 1. The hose pipe 2 communicates with the lower part of a tank 7 in which the plastic material is contained, and air under pressure is supplied to the upper part of this tank in any suitable manner as by the pipe 8 connected with a pressure tank 9 fed by the air pump 10. Also the upper part of the tank 7 is placed in communication with the jet 3 in some suitable manner as by the connection 11 and hose 12, suitable valves 13, 14, 15 being provided so that the air can be admitted to either or both in any desired proportion. Also a relief valve may if desired be provided at 16 so that a fixed pressure can be maintained in the tank 7 without special attention. Additional valves of any suitable or desired nature may be employed at 17 as will be obvious.

With this arrangement, upon a suitable opening of the valves, the viscous liquid will be ejected through the nozzle in an annular stream and into the interior of this stream will be forced the air from the jet 3. The result is not an atomizing or breaking up of the stream into a spray, but an enlargement or swelling of the stream, the rapidity of this swelling being dependent upon the comparative pressures existing in the liquid pipe and the air pipe, the viscosity and tenacity of the substance, and the distance of the nozzle from the surface being coated. With the correct proportion of these quantities the material is expanded by the air into a thin film, and as the nozzle is moved from one point to another with reference to the structure being treated, this film (which necessarily by reason of the forward movement of the liquid and the expansive movement of the air is given a conical shape) is caused to roll under at one side as indicated at 20 in Fig. 3 and to trail at the other side as indicated at 21. The air pressure upon this rolled-under portion drives it strongly into the pores and against the surface of the structure, and the trailing portion 21 falls thereon and becomes incorporated therewith. If the nozzle be moved backward, this superposed layer 21 is covered by yet another film caused by the rolled-under advance side of the liquid sheet, and the two films together forced against the surface of the wall. By thus moving the nozzle back and forth, a layer of any desired thickness may be built up, but being built of these thin plies, each of which is solidly compacted into place, a peculiarly dense and adherent coating is produced.

We have stated that it was unnecessary to clean the surface before beginning this work, although it would naturally be left reasonably broom clean. Apparently the action of the air when the nozzle is first passed over the surface is to dislodge the sand grains, dust particles, and other refuse and blow it through the liquid film; however this is not offered as an explanation, but merely as a statement that dusty or adherent material in small quantity is no detriment. Occasionally a thin veil or sheet of the liquid film will break away and float by itself, and when examined is found to have a nearly complete texture. For the best results of our process there must be no atomizing action, and for this purpose the end of the jet pipe 3 is preferably located beyond, but never inside of the tip of the nipple 5.

The second step in our improved process is performed by the workman B who throws a blast of dry inert granular substance such as sand or fine gravel, against the coated surface by means of a suitable nozzle 25 carried at the end of a flexible conduit 26. As a convenient and desirable arrangement for the projection of this sand we preferably employ a receptacle 27 supported adjacent the same tank 9 heretofore mentioned, air being furnished by a suitable pipe 28 controlled by the valve 30, the granules being introduced into the air stream through a suitable fitting 31. We prefer a uniform clean, white torpedo sand with sharp edges, whose sizes are from about $\frac{1}{16}$th to $\frac{1}{4}$th inch, and we choose such an air pressure as will throw this sand against the plastic layer so the same will become about half embedded therein.

This application of the sand by air blast produces of itself certain advantages above all previous methods, even in addition to the obvious advantages of quickness and thoroughness; for when the sand grains were applied by hand it was very usual to have them rubbed or rocked or rolled into the plastic material so that their outer sides would become smeared to a greater or less extent as well as their inner surfaces, and plaster or most other coatings fails to adhere as thoroughly to this asphaltic material as it does to sharp sand. Also this mode of applying the sand provides an automatic indication of the thoroughness and safety of adhesion of the layer which is to follow.

When concrete sets, there will be found certain areas which are said to possess a "high suction", and appear to result in a rapid absorption of liquids and in a rapid drying and hardening of liquid-containing coatings applied thereto. We do not pretend to account for this condition but its existence is well known.

When binding material of asphaltic or other nature has been applied by previously known methods such as that of Worthen et al., a sudden hardening effect takes place upon such spots and the subsequently applied sand or gravel adheres only very weakly thereto. However when this sand or gravel is applied mixed with plaster as heretofore described, the adhesion of the wet material is sufficient to hold it in place until after the finish coat has been applied, though generally at some future date the whole becomes loosened and falls. The sand blast mode of applying the granular material infallibly exposes these spots, since this kind of material fails to adhere at such points but leaves a naked surface which can be re-treated to the extent necessary prior to the application of any plaster material. Also by applying the plastic material by an air blast as herein described, several layers being superposed one upon the other, the outside layer is much less likely to exhibit this prematurely hardened condition than when the whole substance is applied in one coat as has necessarily been the case with the preceding hot methods and is ordinarily the case when a brush coat is used. Thus the combination of the two steps of throwing the plastic material upon the surface by the air blast method heretofore described and following this application by a coating of sand or gravel applied by an air blast produces certain unexpected and very desirable results.

The third step in the process is the application of the plaster coat which is done by a hand trowel by the workman C according to the usual manner.

The finished structure is illustrated in Fig. 2, wherein 30 represents the concrete wall, 31 the adhesive binding material, 32 the granular material and 33 the plaster coat. Notwithstanding that the binding material is applied in thin layers permitting each to be impacted forcibly upon the previous surface, yet this cohesion causes them ultimately to assume a substantially homogeneous condition.

It will be understood that our process may be stopped at any point, either with the application of the paint coat, or of the granular coat, or of the finish coat; that the paint coat may consist of any suitable material and be applied to any desired surface, concrete being described herein merely by way of illustration; that the finish coat may consist of gypsum, cork, hair, burlap, paint or of any other material whatever, calcined plaster being described merely by way of illustration; also that the first two steps can be repeated as many times as desired, building against the wall any suitable layer of granular and adhesive; besides additional building elements like tile can be applied to the face so prepared; further that the purpose of the application has no limiting effect, and may be for water-proofing, indurating, roughening, smoothing, darkening, lightening, in halls, factories, office buildings, dwellings, roofs, cellars, barns, or bridges. Therefore, while we have described our invention in detail and have even pointed out the apparatus which we prefer to employ in the performance of the steps and manipulations here described, it will be understood that we do not restrict ourselves to any such details of apparatus or in any other manner except as the same and the claims hereto annexed are as required by the prior state of the art.

Having thus described our invention, what we claim is:—

1. The process of applying a viscous ductile coating which consists of injecting gas under pressure into the center of an annular stream of such viscous ductile material whereby said material is inflated into a film which falls upon the surface to be coated.

2. The process of coating a surface with a film of viscous ductile material which consists in drawing said material by air pressure into a film and thereafter forcing said film against said surface by the same air pressure.

3. The process of coating a surface with a film of viscous ductile material which consists of projecting toward said surface under pressure, an annular stream of said material and simultaneously projecting into the center of said stream and toward said surface a blast of air.

4. The process of coating a surface with viscous ductile material which consists of projecting toward said surface under pressure an annular stream of said material, and projecting into said stream at a point between its source and said surface a blast of air also turned toward said surface, at a pressure above that of the liquid.

5. The process of coating a surface with viscous ductile material which consists of projecting toward said surface under pressure an annular stream of said material, and projecting into said stream at a point between its source and said surface a blast of air also turned toward said surface.

6. The process of coating concrete with a uniformly adhesive layer of viscous material which consists of projecting toward said surface under pressure an annular stream of such material, projecting into said stream at a point between its source and said surface a blast of air whereby a floating film is formed and beaten against the concrete surface, and repeating the addition of such films until a layer of requisite thickness is obtained.

7. The method of forming structural surfaces, which consists in applying to a given surface an adherent material, air blasting upon said layer a coating of a comminuted substance at such a pressure as to embed each particle about half of its depth, and finally applying a final coating to such comminuted substance so applied.

In testimony whereof, we hereunto affix our signatures.

ARTHUR G. BAGNALL.
JAMES A. TAYLOR.

DISCLAIMER 1,239,074.—*Arthur G. Bagnall* and *James A. Taylor*, Cleveland, Ohio. Process of Coating Surfaces. Patent dated September 4, 1917. Disclaimer filed February 15, 1930, by *The Union Trust Company*, executor of the last will of Charles H. Parkin, deceased, the assignee.

Hereby enters this disclaimer to all that part of the said specification and claim which is contained in claim 7 of said patent.

[*Official Gazette March 4, 1930.*]